United States Patent
Ohishi

(10) Patent No.: US 8,003,256 B2
(45) Date of Patent: Aug. 23, 2011

(54) POSITIVE ELECTRODE ACTIVE MATERIAL HAVING MAGNESIUM ATOMS AND SULFATE GROUPS, METHOD FOR MANUFACTURING THE SAME, AND LITHIUM SECONDARY BATTERY HAVING THE SAME

(75) Inventor: Yoshihide Ohishi, Tokyo (JP)

(73) Assignee: Nippon Chemical Industrial Co., Ltd, Tokyo (JP)

(*) Notice: Subject to any disclaimer, the term of this patent is extended or adjusted under 35 U.S.C. 154(b) by 0 days.

(21) Appl. No.: 12/173,852

(22) Filed: Jul. 16, 2008

(65) Prior Publication Data

US 2009/0023071 A1   Jan. 22, 2009

(30) Foreign Application Priority Data

Jul. 20, 2007   (JP) ................ 2007-189477

(51) Int. Cl.
    *H01M 4/13* (2006.01)
(52) U.S. Cl. ............. 429/231.6; 429/231.3; 429/231.95; 429/218.1; 29/623.1
(58) Field of Classification Search .......... 429/122–347, 429/231.3, 231.95, 231.6, 218.1; 29/623.1–623.5
    See application file for complete search history.

(56) References Cited

U.S. PATENT DOCUMENTS

| 5,286,582 | A | 2/1994 | Tahara et al. |
| 2002/0192565 | A1* | 12/2002 | Ueda et al. .................... 429/331 |
| 2003/0104279 | A1* | 6/2003 | Miyazaki et al. .......... 429/231.3 |

FOREIGN PATENT DOCUMENTS

| JP | 5054889 | A | 3/1993 |
| JP | 10-29820 | A | 2/1998 |
| JP | 10-81520 | A | 3/1998 |
| JP | 10-81521 | A | 3/1998 |
| JP | 2000-11993 | A | 1/2000 |
| JP | 2000-21402 | A | 1/2000 |
| JP | 2002-201028 | A | 7/2002 |
| JP | 2003-221235 | A | 8/2003 |
| JP | 2004-79386 | A | 3/2004 |
| JP | 2004-339032 | A | 12/2004 |
| JP | 2004-342554 | A | 12/2004 |
| JP | 2005-225734 | A | 8/2005 |
| JP | 2006-169048 | A | 6/2006 |

OTHER PUBLICATIONS

Machine Translation of JP2000021402A to Inoue et al. originally published Jan. 2000.*
Machine Translation of JP2006169048A to Awano et al. originally published Jun. 2006.*
Mizushima, K. et al., "A New Cathode Material for Batteries of High Energy Density", Material Research Bulletin, 1980, pp. 783-789, vol. 15., Pergamon Press Ltd., USA.

* cited by examiner

*Primary Examiner* — Basia Ridley
*Assistant Examiner* — Jonathan G Leong
(74) *Attorney, Agent, or Firm* — Smith Patent Office

(57) ABSTRACT

A positive electrode active material for a lithium secondary battery according to an aspect of the present invention is a lithium-transition metal compound oxide which is produced by mixing a lithium compound, a transition metal compound, a magnesium compound, and a sulfate and conducting firing and which contains magnesium atoms and sulfate groups, wherein a magnesium halide is used as the magnesium compound.

2 Claims, No Drawings

POSITIVE ELECTRODE ACTIVE MATERIAL HAVING MAGNESIUM ATOMS AND SULFATE GROUPS, METHOD FOR MANUFACTURING THE SAME, AND LITHIUM SECONDARY BATTERY HAVING THE SAME

BACKGROUND OF THE INVENTION

1. Field of the Invention

The present invention relates to a positive electrode active material for a lithium secondary battery, a method for manufacturing the same, and a lithium secondary battery having, in particular, an excellent cycle characteristic.

2. Description of the Related Art

In recent years, along with rapid progress in household electric appliances toward portable and cordless, lithium ion secondary batteries have become commercially available as power sources for compact electronic devices, e.g., lap top personal computers, cellular phones, and video cameras. Regarding the lithium ion secondary batteries, since Mizushima et al. reported the usefulness of lithium cobaltate as a positive electrode active material for the lithium ion secondary batteries in 1980 ("Material Research Bulletin", vol 15, p. 783-789 (1980)), active research and development have been made on lithium compound oxide, resulting in many proposals until now.

However, a lithium secondary battery by using lithium cobaltate has a problem in deterioration of a cycle characteristic due to, for example, elution of cobalt atoms.

Furthermore, lithium-cobalt compound oxides in which Mg atoms have substituted for a part of Co atoms of lithium cobaltate have been propHsed as positive electrode active materials (refer to, for example, pages 1 and 8 of Japanese Unexamined Patent Application Publication No. 5-54889, pages 2 and 3 of Japanese Unexamined Patent Application Publication No. 2000-11993, and pages 2 and 7 of Japanese Unexamined Patent Application Publication No. 2004-79386).

Regarding the lithium-cobalt compound oxides in the above-described three patent documents, magnesium oxide, magnesium carbonate, or the like is used as a Mg source of a raw material, and regarding lithium secondary batteries including lithium-cobalt compound oxides which contain the resulting magnesium atoms (hereafter may be referred to as Mg atoms) and which serve as positive electrode active materials, it is difficult to obtain satisfactory cycle characteristic.

The present inventor et al. previously proposed to use a lithium-cobalt compound oxide, which was produced by using a $MgF_2$ halide as a Mg source, as a positive electrode active material for a lithium secondary battery (refer to, for example, Japanese Unexamined Patent Application Publication No. 2003-221235, Japanese Unexamined Patent Application Publication No. 2004-339032, Japanese Unexamined Patent Application Publication No. 2006-169048, Japanese Unexamined Patent Application Publication No. 2004-342554, and Japanese Unexamined Patent Application Publication No. 2005-225734).

Furthermore, use of a lithium-cobalt compound oxide, which contains sulfate groups, as a positive electrode active material for lithium secondary battery have been previously proposed (Japanese Unexamined Patent Application Publication No. 2000-21402).

The present inventor made further study on the basis of Japanese Unexamined Patent Application Publication Nos. 2003-221235, 2004-339032, 2006-169048, 2004-342554, and 2005-225734 and found that in the case where a magnesium halide was used as a Mg source, magnesium was present preferentially as a magnesium oxide on surfaces of particles of a lithium-transition metal compound oxide produced by firing through the action of an anionic component constituting the raw material magnesium compound so as to suppress elution of cobalt ions which had an influence on a cycle characteristic and, thereby, a lithium secondary battery including the lithium-transition metal compound oxide as a positive electrode active material exhibited excellent cycle characteristic. It is expected that the performance of the lithium secondary battery is further improved.

SUMMARY OF THE INVENTION

The present invention has been made in consideration of the above-described related art. Accordingly, it is an object of the present invention to provide a positive electrode active material for a lithium secondary battery which can impart an excellent cycle characteristic to a lithium secondary battery when being used as a positive electrode active material of the lithium secondary battery and which can be industrially advantageously produced and a method for manufacturing the same.

Furthermore, it is an object of the present invention to provide a lithium secondary battery including the above-described positive electrode active material and exhibiting, in particular, an excellent cycle characteristic.

The present inventor conducted intensive research under the above-described circumstances. As a result, it was found that a lithium secondary battery including a positive electrode active material, in which sulfate groups were further contained in a lithium-transition metal compound oxide produced by using a magnesium halide as a magnesium compound serving as a Mg source, exhibited excellent battery performance, e.g., in particular, a cycle characteristic. Consequently, the present invention has been completed.

A positive electrode active material for a lithium secondary battery according to a first aspect of the present invention is a lithium-transition metal compound oxide which is produced by mixing a lithium compound, a transition metal compound, a magnesium compound, and a sulfate and conducting firing and which contains magnesium atoms and sulfate groups, wherein a magnesium halide is used as the above-described magnesium compound.

A method for manufacturing a positive electrode active material for a lithium secondary battery according to a second aspect of the present invention includes the step of using a magnesium halide as a magnesium compound in a method for manufacturing a lithium-transition metal compound oxide containing magnesium atoms and sulfate groups by mixing a lithium compound, a transition metal compound, the magnesium compound, and a sulfate and conducting firing.

A lithium secondary battery according to a third aspect of the present invention includes the positive electrode active material for a lithium secondary battery according to the above-described first aspect of the present invention.

The positive electrode active material for a lithium secondary battery according to an aspect of the present invention can impart an excellent cycle characteristic to, in particular, a lithium secondary battery when being used as a positive electrode active material of the lithium secondary battery.

Furthermore, according to the method for manufacturing a positive electrode active material for a lithium secondary battery, the positive electrode active material for a lithium secondary battery can be produced by an industrially advantageous method.

DESCRIPTION OF THE PREFERRED EMBODIMENTS

The present invention will be described below with reference to the preferred embodiments.

A positive electrode active material for a lithium secondary battery according to an aspect of the present invention is a lithium-transition metal compound oxide which is produced by mixing a lithium compound, a transition metal compound, a magnesium compound, and a sulfate and conducting firing and which contains magnesium atoms and sulfate groups, wherein a magnesium halide is used as the above-described magnesium compound. The positive electrode active material for a lithium secondary battery having the above-described configuration can impart a particularly excellent cycle characteristic to a lithium secondary battery including the positive electrode active material.

In the present invention, examples of lithium-transition metal compound oxides allowed to contain the above-described Mg atoms and the sulfate groups include $LiCoO_2$, $LiNi_{1-x-y}Co_xMn_yO_2$ ($0 \leq x \leq 1.0$, $0 \leq y \leq 1.0$), $LiFePO_4$, $LiNi_{0.5}Mn_{1.5}O_4$, and $LiMn_2O_4$. Among them, $LiCoO_2$ is preferable because a magnesium oxide is allowed to become present preferentially on surfaces of particles owing to the magnesium halide, and a synergetic effect of the Mg atoms and the sulfate groups, which are allowed to be contained, is high so that, in particular, the cycle characteristic of a lithium secondary battery including the lithium-transition metal compound oxide, which contains the Mg atoms and the sulfate groups and which serves as a positive electrode active material, becomes excellent.

It is desirable that the Mg atom content in the lithium-transition metal compound oxide containing the Mg atoms and the sulfate groups and serving as the positive electrode active material for a lithium secondary battery according to an aspect of the present invention is specified to be 0.010 to 1.00 percent by weight in terms of magnesium atom, and preferably 0.10 to 0.50 percent by weight. The reason for this is that if the Mg atom content is less than 0.010 percent by weight in terms of magnesium atom, the lithium secondary battery including the lithium-transition metal compound oxide as a positive electrode active material tends to exhibit a poor cycle characteristic, on the other hand, if the content exceeds 1.0 percent by weight, discharge capacity tends to become insufficient.

In the present invention, in the case where the magnesium halide is used in combination with an oxide, a hydroxide, and a carbonate of magnesium (hereafter referred to as a "second magnesium compound"), a reaction between an anionic substance and a firing container does not occur, the releasability from the firing container is favorable and, therefore, a lithium-transition metal compound oxide containing Mg atoms and sulfate groups can be industrially advantageously produced.

In the case where the second magnesium compound or magnesium sulfate serving as a sulfate, as described later, is used besides the magnesium halide, the Mg atom content in the above-described lithium-transition metal compound oxide refers to a total amount ($Mg^1+Mg^2+Mg^3$) of magnesium atoms in the magnesium halide ($Mg^1$), magnesium atoms in the second magnesium compound ($Mg^2$), and magnesium atoms in the magnesium sulfate ($Mg^3$).

It is desirable that the sulfate group content in the lithium-transition metal compound oxide containing the Mg atoms and the sulfate groups is specified to be 0.010 to 0.500 percent by weight in terms of $SO_4$, and preferably 0.050 to 0.200 percent by weight. The reason for this is that if the sulfate group content is less than 0.010 percent by weight in terms of $SO_4$, an effect of improving the cycle characteristic of the lithium secondary battery including the lithium-transition metal compound oxide as a positive electrode active material tends to be reduced, on the other hand, if the content exceeds 0.50 percent by weight, an initial discharge capacity tends to become insufficient.

In the lithium-transition metal compound oxide containing the Mg atoms and the sulfate groups according to an aspect of the present invention, it is desirable that the content of free anions which are eluted into water and which are selected from halogen ions and sulfate ions mainly resulting from the raw material magnesium halide and sulfate is specified to be 5,000 ppm or less, and preferably 3,000 ppm or less. The reason for this is that if the content of the above-described free anions exceeds 5,000 ppm, troubles, e.g., an increase in viscosity, tend to occur in synthesis of a positive electrode plate.

The lithium-transition metal compound oxide containing the Mg atoms and the sulfate groups and serving as the positive electrode active material for a lithium secondary battery according to an aspect of the present invention has the above-described physical properties and, in addition, the average particle diameter determined on the basis of a laser particle size distribution measuring method is 1 to 30 μm, and preferably 3 to 25 μm. In the case where the average particle diameter is within the above-described range, a coating film having a uniform thickness can be formed. If the average particle diameter is a particularly preferable 10 to 20 μm, the heat stability of the lithium secondary battery including the lithium-transition metal compound oxide containing the Mg atoms and the sulfate groups and serving as a positive electrode active material can be further improved. Hereafter, the average particle diameter refers to a value determined on the basis of the laser particle size distribution measuring method.

The lithium-transition metal compound oxide containing the Mg atoms and the sulfate groups and serving as the positive electrode active material for a lithium secondary battery according to an aspect of the present invention has a BET specific surface area of 0.05 to 1 $m^2/g$, and preferably 0.15 to 0.6 $m^2/g$. It is preferable that the BET specific surface area is within the above-described range because the safety is at a good level.

The positive electrode active material for a lithium secondary battery having the above-described various physical properties, according to an aspect of the present invention, can be produced by using a magnesium halide as a magnesium compound in a method for manufacturing the lithium-transition metal compound oxide containing the Mg atoms and the sulfate groups, the method including the steps of mixing a lithium compound, a transition metal compound, the magnesium compound, and a sulfate and conducting firing.

Examples of above-described raw material lithium compounds include oxides, hydroxides, carbonates, nitrates, and organic acid salts of lithium. Among them, industrially inexpensive lithium carbonate is preferable. It is particularly desirable that the average particle diameter of the lithium compound is 0.1 to 200 μm, and preferably 2 to 50 μm because the reactivity is at a good level.

Examples of above-described raw material transition metal compounds include oxides, oxyhydroxides, hydroxides, carbonates, nitrates, and organic acid salts, which contain a transition metal element selected from cobalt, nickel, manganese, and iron. The transition metal compound may be a complex compound containing at least two types of the above-described transition metal elements. As for the complex compound, preferably, a compound hydroxide, a compound oxyhydroxide, a compound carbonate, or a compound oxide is used. The above-described compound oxide can be prepared by, for example, a coprecipitation method. Specifically, a compound hydroxide can be coprecipitated by mixing an aqueous solution containing at least two types of the above-described transition metal elements, an aqueous solution of an complexing agent, and an aqueous solution of alkali (refer to Japanese Unexamined Patent Application Publication No. 10-81521, Japanese Unexamined Patent Application Publication No. 10-81520, Japanese Unexamined Patent Application Publication No. 10-29820, Japanese Unexamined Patent Application Publication No. 2002-201028, and the like). In the case where the compound oxyhydroxide is used, a precipitate of the compound hydroxide may be obtained by following the above-described coprecipitation operation and, thereafter, the compound hydroxide may be oxidized by blowing air into a reaction solution. In the case where the compound oxide is used, the compound oxide can be produced by obtaining a precipitate of the compound hydroxide by following the coprecipitation operation and, thereafter, heat-treating the resulting precipitate at, for example, 200° C. to 500° C. In the case where the compound carbonate is used, the compound carbonate can be produced by preparing an aqueous solution containing at least two types of the above-described transition metal elements and an aqueous solution of a complexing agent, as in the above-described coprecipitation operation, preparing an aqueous solution of alkali carbonate or alkali hydrogencarbonate instead of the aqueous solution of alkali, and mixing them. It is particularly desirable that the average particle diameter of the transition metal compound is 0.5 to 30.0 μm, and preferably 10.0 to 25.0 μm because the reactivity is at a good level.

Examples of magnesium halides include $MgCl_2$, $MgBr_2$, $MgI_2$, and $MgF_2$. Among them, $MgF_2$ is particularly preferably used in the present invention because a synergetic effect of $MgF_2$ with the sulfate is high. It is particularly desirable that the average particle diameter of the magnesium halide is 1.0 to 30.0 μm, and preferably 1.0 to 20.0 μm because the reactivity is at a good level.

Regarding the positive electrode active material for a lithium secondary battery according to an aspect of the present invention, in the case where the above-described second magnesium compound is used in combination in addition to the above-described magnesium halide serving as a magnesium source, a reaction between anionic substance and a firing container does not occur, adhesion to the firing container is prevented and, therefore, the positive electrode active material for a lithium secondary battery according to an aspect of the present invention can be industrially advantageously produced. Regarding the physical properties of the second magnesium compound, it is particularly desirable that the average particle diameter is 1.0 to 30.0 μm, and preferably 1.0 to 20.0 μm because the reactivity is at a good level.

The sulfate may be an inorganic substance or an organic substance. As for the inorganic salt, for example, iron sulfate, cobalt sulfate, nickel sulfate, zinc sulfate, copper sulfate, lithium sulfate, potassium sulfate, magnesium sulfate, calcium sulfate, barium sulfate, strontium sulfate, beryllium sulfate, and hydrates thereof can be used. As for the organic acid salt, tetrabutylammonium hydrogensulfate, trifluoromethane sulfonic acid, 1-naphthylamine-2-sulfonic acid, 1-naphthylamine-5-sulfonic acid, 1-naphthol-3,6-disulfonic acid, p-bromobenzenesulfonic acid, p-anilinesulfonic acid, o-xylene-4-sulfonic acid, dimethylsulfone, o-sulfosalicyclic acid, and the like can be used. Among them, alkaline earth metal sulfates of sulfuric acid, that is, magnesium sulfate, calcium sulfate, barium sulfate, and strontium sulfate, are preferable. In particular, calcium sulfate is preferable because a synergetic effect with the magnesium halide is high. The average particle diameter of the sulfate is not specifically limited. However, in many cases, the average particle diameter is 1.0 to 500 μm.

The production histories of the above-described raw material lithium compound, transition metal compound, magnesium halide, second magnesium compound, and sulfate are not specifically limited. However, it is preferable that the impurity content is minimum in order to produce a high purity lithium-transition metal compound oxide.

Regarding the reaction operation, first, predetermined amounts of the above-described raw material lithium compound, transition metal compound, sulfate, and magnesium halide and the second magnesium compound, which is added if necessary, are mixed. Either a dry method or a wet method is used for the mixing. However, a dry method is preferable because of easiness in production. In the dry mixing, preferably, a blender or the like for homogeneously mixing the raw materials is used.

Regarding the blend ratio of the above-described raw material lithium compound, transition metal compound, magnesium halide, and sulfate, the lithium compound is 0.90 to 1.20, and preferably 0.98 to 1.10, in terms of molar ratio (Li/M) of Li atom to transition metal atom (M) in the transition metal compound. In the present invention, in the case where the amount of blend of the above-described Li atom is specified within the above-described range, a stable discharge capacity is obtained. On the other hand, if the ratio of Li atom is less than 0.90 in terms of molar ratio (Li/M) of Li atom, the discharge capacity is reduced significantly, and if the ratio of Li atom exceeds 1.20, the cycle performance tends to deteriorate, undesirably.

It is desirable that the magnesium halide is added at such a blend ratio that magnesium atom becomes 0.010 to 1.00 percent by weight, preferably 0.10 to 0.50 percent by weight relative to lithium-transition metal compound oxide generated. Furthermore, in the case where the second magnesium compound is used in combination, it is desirable that the amount of addition of the second magnesium compound is specified to be 0.010 to 1.00 percent by weight, preferably 0.10 to 0.50 percent by weight of the above-described magnesium halide. If the amount of addition is within the above-described range, a reaction between an anionic substance and a firing container does not occur, the releasability from the firing container is favorable and, therefore, the positive electrode active material for a lithium secondary battery can be industrially advantageously produced.

It is desirable that the blend ratio of the above-described sulfate is specified to be 0.010 to 0.500 percent by weight, preferably 0.050 to 0.200 percent by weight in terms of $SO_4$ relative to lithium-transition metal compound oxide generated.

It is favorable that the blend ratios of the magnesium halide and the sulfate in the positive electrode active material for a lithium secondary battery according to an aspect of the present invention is specified to be within the above-described ranges because the lithium secondary battery including the positive electrode active material exhibits a particularly excellent cycle characteristic.

Subsequently, the mixture in which the above-described raw materials are homogeneously mixed is fired. In the case where a substance which generates water during firing is fired in the present invention, it is preferable that multistage firing is conducted in the air or an oxygen atmosphere. Preferably, firing is conducted slowly within the range of about 200° C. to 400° C. in which water contained in the raw materials is eliminated and, thereafter, the temperature is raised to about 700° C. to 900° C. rapidly and firing is conducted for 1 to 30 hours. In the case where the other transition metals are used, it is desirable that firing is conducted in the air or an oxygen atmosphere at 800° C. to 1,150° C., and preferably 900° C. to 1,100° C. for 1 to 30 hours.

The firing can be conducted any number of times, as necessary. For the purpose of ensuring uniform powder characteristics, after the firing is conducted once, pulverization may be conducted and then firing may be conducted again. After the firing is conducted, cooling is conducted appropriately and, if necessary, pulverization and sizing are conducted, so that a lithium-transition metal compound oxide containing Mg atoms and sulfate groups is produced and is allowed to serve as the positive electrode active material for the lithium secondary battery according to an aspect of the present invention.

The pulverization, which is conducted as necessary, is conducted appropriately in the case where, for example, the transition metal compound oxide resulting from firing and containing Mg atoms and sulfate groups is brittle and is in the shape of bonded blocks. The particles themselves of the lithium-transition metal compound oxide have a specific average particle diameter and a BET specific surface area. That is, regarding the resulting lithium-transition metal compound oxide containing Mg atoms and sulfate groups, the average particle diameter is 0.5 to 30.0 μm, and preferably 10 to 25 μm, and the BET specific surface area is 0.05 to 1.0 $m^2/g$, and preferably 0.15 to 0.60 $m^2/g$.

The lithium-transition metal compound oxide serving as the positive electrode active material for a lithium secondary battery according to an aspect of the present invention has the above-described powder characteristic. In addition, according to the preferred embodiments of the present invention, the magnesium atom content is 0.010 to 1.00 percent by weight, and preferably 0.10 to 0.50 percent by weight, the sulfate group content is 0.010 to 0.500 percent by weight, and preferably 0.050 to 0.200 percent by weight in terms of $SO_4$, and the content of free anions selected from halogen ions and sulfate ions mainly resulting from the raw material magnesium halide and sulfate group is 5,000 ppm or less, and preferably 3,000 ppm or less.

The lithium secondary battery according to an aspect of the present invention is produced by using the above-described positive electrode active material for a lithium secondary battery and includes a positive electrode, a negative electrode, a separator, and a nonaqueous electrolyte containing a lithium salt. The positive electrode is formed by, for example, applying a positive electrode mixture to a positive electrode current collector, followed by drying and the like. The positive electrode mixture is composed of, for example, a positive electrode active material, an electrically conductive agent, a binder, and a filler added if necessary. In the lithium secondary battery according to an aspect of the present invention, the above-described lithium-transition metal compound oxide containing Mg atoms and sulfate groups and serving as a positive electrode active material is applied to the positive electrode uniformly. Consequently, regarding the lithium secondary battery according to an aspect of the present invention, in particular, deterioration in the load characteristic and the cycle characteristic do not easily occur.

It is desirable that the content of the positive electrode active material contained in the positive electrode mixture is 70 to 100 percent by weight, and preferably 90 to 98 percent by weight.

The positive electrode current collector is not specifically limited insofar as it is an electron conductor and is not chemically changed in a battery constructed. Examples thereof include stainless steel, nickel, aluminum, titanium, fired carbon, and aluminum or stainless steel having a surface treated with carbon, nickel, titanium, or silver. These materials may be used after the surfaces thereof are oxidized, or be used after the current collector surfaces are provided with unevenness through a surface treatment. Examples of forms of the current collector include foil, a film, a sheet, a net, a punched material, a lath material, a porous material, a foamed material, a group of fibers, and a nonwoven fabric molded material. The thickness of the current collector is not specifically limited. However, it is preferable that the thickness is specified to be 1 to 500 μm.

The electrically conductive agent is not specifically limited insofar as it is an electron conductive material and is not chemically changed in a battery constructed. Examples of electrically conductive materials include graphite, e.g., natural graphite and artificial graphite; carbon black and the like, e.g., carbon black, acetylene black, Ketjenblack, channel black, furnace black, lamp black, and thermal black; electrically conductive fibers, e.g., carbon fibers and metal fibers; carbon fluoride; metal powders, e.g., aluminum and nickel powders; electrically conductive whiskers, e.g., zinc oxide and potassium titanate; electrically conductive metal oxides, e.g., titanium oxide; and polyphenylene derivatives. Examples of natural graphite include flaky graphite, scaly graphite, and earthy graphite. These can be used alone or in combination. The blend ratio of the electrically conductive agent is 1 to 50 percent by weight, and preferably 2 to 30 percent by weight in the positive electrode mixture.

Examples of binders include starch, polyvinylidene fluoride, polyvinyl alcohol, carboxymethyl cellulose, hydroxypropyl cellulose, regenerated cellulose, diacetyl cellulose, polyvinyl pyrrolidone, tetrafluoroethylene, polyethylenes, polypropylenes, ethylene-propylene-diene terpolymers (EPDM), sulfonated EPDM, styrene butadiene rubber, fluororubber, tetrafluoroethylene-hexafluoroethylene copolymers, tetrafluoroethylene-hexafluoropropylene copolymers, tetrafluoroethylene-perfluoroalkyl vinyl ether copolymers, vinylidene fluoride-hexafluoropropylene copolymers, vinylidene fluoride-chlorotrifluoroethylene copolymers, ethylene-tetrafluoroethylene copolymers, polychlorotrifluoroethylenes, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers or ($Na^+$) ion cross-linked products thereof, ethylene-methacrylic acid copolymers or ($Na^+$) ion cross-linked products thereof, ethylene-methyl acrylate copolymers or ($Na^+$) ion cross-linked products thereof, ethylene-methyl methacrylate copolymers or ($Na^+$) ion cross-linked products thereof, polysaccharides, e.g., polyethylene oxide, thermoplastic resins, and polymers having rubber elasticity. These can be used alone or in combination. In the case where compounds, such as polysaccharides, containing functional groups which react with lithium are used, it is preferable that compounds, such as an isocyanate group, are added so as to deactivate the functional groups. The blend ratio of the binder is 1 to 50 percent by weight, and preferably 5 to 15 percent by weight in the positive electrode mixture.

In the positive electrode mixture, the filler suppresses volume expansion and the like of the positive electrode and is added if necessary. As for the filler, any fibrous material which is not chemically changed in a battery constructed can be used. For example, olefin based polymer, e.g., polypropylene and polyethylene, and fibers of glass, carbon and the like are used. The amount of addition of filler is not specifically limited. However, it is preferable that the amount of addition is 0 to 30 percent by weight in the positive electrode mixture.

The negative electrode is formed by applying a negative electrode material to a negative electrode current collector, followed by drying and the like. The negative electrode current collector is not specifically limited insofar as it is an electron conductor and is not chemically changed in a battery constructed. Examples thereof include stainless steel, nickel, copper, titanium, aluminum, fired carbon, copper or stainless steel having a surface treated with carbon, nickel, titanium, or silver, and aluminum-cadmium alloys. These materials may be used after the surfaces thereof are oxidized, or be used after the current collector surfaces are provided with unevenness through a surface treatment. Examples of forms of the current collector include foil, a film, a sheet, a net, a punched material, a lath material, a porous material, a foamed material, fiber groups, and a nonwoven fabric molded material. The thickness of the current collector is not specifically limited. However, it is preferable that the thickness is specified to be 1 to 500 μm.

The negative electrode material is not specifically limited. Examples thereof include carbonaceous materials, metal compound oxides, lithium metal, lithium alloys, silicon alloys, tin alloys, metal oxides, electrically conductive polymers, chalcogen compounds, and Li—Co—Ni based materials. Examples of carbonaceous materials include non-graphitizable carbon materials and graphite based carbon materials. Examples of metal compound oxides include compounds, e.g., $Sn_p(M^1)_{1-p}(M^2)_qO_r$ (in the formula, $M^1$ represents at least one type of element selected from Mn, Fe, Pb, and Ge, $M^2$ represents at least one type of element selected from Al, B, P, Si, first, second, and third groups of the periodic table, and halogen elements, and $0<p\leq1$, $1\leq q\leq3$, and $1\leq r\leq8$ are satisfied), $Li_xFe_2O_3$ ($0\leq x\leq1$), and $Li_xWO_2$ ($0\leq x\leq1$). Examples of metal oxides include GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, and $Bi_2O_5$. Examples of electrically conductive polymers include polyacetylenes and poly-p-phenylenes.

As for the separator, an insulating thin film exhibiting large ion permeability and having a predetermined mechanical strength is used. An olefin based polymer, e.g., polypropylene, or a sheet or a nonwoven fabric formed from a glass fiber, polyethylene, or the like is used because of the organic solvent resistance and the hydrophobicity. The pore diameter of the separator may be within the range generally applicable to batteries and is, for example, 0.01 to 10 μm. The thickness of the separator may be within the range generally applicable to batteries and is, for example, 5 to 300 μm. In the case where a solid electrolyte, e.g., a polymer, is used as an electrolyte described later, the solid electrolyte may also serve as the separator.

The nonaqueous electrolyte containing a lithium salt includes a nonaqueous electrolyte and a lithium salt. As for the nonaqueous electrolyte, nonaqueous electrolytic solutions, organic solid electrolytes, and inorganic solid electrolytes are used. Examples of nonaqueous electrolytic solutions include one type of or mixtures of at least two types of aprotic organic solvents, e.g., N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethylsulfoxide, 1,3-dioxolane, formaldehyde, dimethylformamide, dioxolane, acetonitrile, nitromethane, methyl formate, methyl acetate, phosphoric triester, trimethoxymethane, dioxolane derivatives, sulfolane, methylsulfolane, 3-methyl-2-oxazolidinone, 1,3-dimethyl-2-imidazolidinone, propylene carbonate derivatives, tetrahydrofuran derivatives, diethyl ether, 1,3-propane sultone, methyl propionate, and ethyl propionate.

Examples of organic solid electrolytes include polyethylene derivatives, polyethylene oxide derivatives or polymers containing them, polypropylene oxide derivatives or polymers containing them, phosphoric acid ester polymers, polymers, e.g., polyphosphazene, polyaziridine, polyethylene sulfide, polyvinyl alcohol, polyvinylidene fluoride, and polyhexafluoropropylene, containing ionic dissociation groups, and mixtures of the polymers containing ionic dissociation groups and the above-described nonaqueous electrolytic solutions.

As for the inorganic solid electrolyte, nitrides, halides, oxoates, sulfides, and the like of Li can be used. Examples thereof include $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $P_2S_5$, $Li_2S$ or $Li_2S$—$P_2S_5$, $Li_2S$—$SiS_2$, $Li_2S$—$GeS_2$, $Li_2S$—$Ga_2S_3$, $Li_2S$—$B_2S_3$, $Li_2S$—$P_2S_5$—X, $Li_2S$—$SiS_2$—X, $Li_2S$—$GeS_2$—X, $Li_2S$—$Ga_2S_3$—X, and $Li_2S$—$B_2S_3$—X (in the formulae, X presents at least one type selected from LiI, $B_2S_3$, and $Al_2S_3$).

Furthermore, in the case where the inorganic solid electrolyte is amorphous (glass), compounds containing oxygen, e.g., lithium phosphate ($Li_3PO_4$), lithium oxide ($Li_2O$), lithium sulfate ($Li_2SO_4$), phosphorus oxide ($P_2O_5$), and lithium borate ($Li_3BO_3$) or compounds containing nitrogen, e.g., $Li_3PO_{4-x}N_{2x/3}$ (x satisfies $0<x<4$), $Li_4SiO_{4-x}N_{2x/3}$ (x satisfies $0<x<4$), $Li_4GeO_{4-x}N_{2x/3}$ (x satisfies $0<x<4$), and $Li_3BO_{3-x}N_{2x/3}$ (x satisfies $0<x<3$), can be contained in the inorganic solid electrolyte. The addition of the compound containing oxygen or the compound containing nitrogen can increase the gap of an amorphous skeleton formed, reduce hindrance to movement of lithium ions and, furthermore, improve the ion conductivity.

As for the lithium salt, salts soluble in the above-described nonaqueous electrolytes are used. Examples thereof include one type of or mixtures of at least two types of salts, e.g., LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carboxylates, lithium tetraphenylborate, and imides.

Compounds for improving the charge-discharge characteristics and the flame retardancy can be added to the nonaqueous electrolyte. Examples thereof include pyridine, triethyl phosphite, triethanolamine, cyclic ethers, ethylene diamine, n-glyme, hexaphosphoric triamide, nitrobenzene derivatives, sulfur, quinoneimine dye, N-substituted oxazolidinone and N,N-substituted imidazolidine, ethylene glycol dialkyl ethers, ammonium salts, polyethylene glycols, pyrrole, 2-methoxyethanol, aluminum trichloride, monomers of electrically conductive polymer electrode active materials, triethylenephosphonamide, trialkylphosphine, morpholine, aryl compounds having carbonyl groups, hexamethylphosphoric triamide and 4-alkylmorpholine, bicyclic tertiary amines, oil, phosphonium salts and tertiary phosphonium salts, phosphazene, and carbonic acid esters. In order to allow the electrolytic solution to become flame-retardant, halogen-containing solvents, e.g., carbon tetrachloride and ethylene trifluoride, can be contained in the electrolytic solution. Furthermore, in order to ensure the suitability for high temperature preservation, carbon dioxide can be contained in the electrolytic solution.

The lithium secondary battery according to an aspect of the present invention exhibits excellent battery performance, in particular, a cycle characteristic. The shape of the battery may be any shape of a button, a sheet, a cylinder, a rectangle, a coin, or the like.

Uses of the lithium secondary battery according to an aspect of the present invention are not specifically limited. Examples of uses include electronic devices of notebook personal computers, lap top personal computers, pocket word processors, cellular phones, cordless handsets, portable CD players, radios, liquid crystal televisions, backup power sources, electric shavers, memory cards, video movies, and the like and consumer-oriented electronic devices of automobiles, motor vehicles, video game machines, and the like.

EXAMPLES

The present invention will be described below in detail with reference to the examples. However, the present invention is not limited to them.

Sulfate Sample

Sulfates having physical properties shown in Table 1 were used. The average particle diameter was determined on the basis of a laser particle size distribution measuring method.

TABLE 1

| Sample | Type of sulfate | Average particle diameter (μm) |
|---|---|---|
| 1-1 | calcium sulfate | 12.4 |
| 1-2 | magnesium sulfate | 420 |

Note)
calcium sulfate ($CaSO_4 \cdot 2H_2O$; produced by KISHIDA CHEMICAL Co., Ltd.),
magnesium sulfate ($MgSO_4 \cdot 7H_2O$; produced by JUNSEI CHEMICAL CO., LTD.)

pulverization and sizing were conducted so that a lithium-transition metal compound oxide containing Mg atoms and sulfate groups was produced.

Comparative Example 1

Tricobalt tetraoxide (average particle diameter 2 μm) and lithium carbonate (average particle diameter 7 μm) were weighed in such a way that the molar ratio of Li atom to cobalt atom became as shown in Table 2. Firing was conducted in an alumina bowl in the air with a temperature and a time shown in Table 2. After completion of the firing, the fired product was pulverized and sized so that a lithium-transition metal compound oxide containing Mg atoms and sulfate atoms was produced.

Comparative Examples 2 to 4

Tricobalt tetraoxide (average particle diameter 2 μm) and lithium carbonate (average particle diameter 7 μm) were weighed in such a way that the molar ratio of Li atom to cobalt atom became as shown in Table 2. Furthermore, $MgF_2$ (produced by STELLA CHEMIFA CORPORATION; average particle diameter 6.0 μm) or a sulfate was dry-mixed sufficiently in such a way that the molar ratio shown in Table 2 was ensured. Thereafter, firing was conducted in an alumina bowl in the air with a temperature and a time shown in Table 2. After completion of the firing, the fired product was pulverized and sized so that a lithium-transition metal compound oxide containing Mg atoms and sulfate groups was produced.

TABLE 2

| | Type of sulfate | Amount of blend of raw material (mol) | | | | Firing temperature (° C.) | Time (h) |
|---|---|---|---|---|---|---|---|
| | | Li2CO3 | Co3O4 | MgF2 | Sulfate | | |
| Example 1 | 1-1 | 1.5600 | 1.0000 | 0.0150 | 0.0015 | 1000 | 16 |
| Example 2 | 1-1 | 1.5600 | 1.0000 | 0.0150 | 0.0060 | 1000 | 16 |
| Example 3 | 1-1 | 1.5600 | 1.0000 | 0.0150 | 0.0120 | 1000 | 16 |
| Example 4 | 1-2 | 1.5600 | 1.0000 | 0.0135 | 0.0015 | 1000 | 16 |
| Example 5 | 1-2 | 1.5600 | 1.0000 | 0.0090 | 0.0060 | 1000 | 16 |
| Example 6 | 1-2 | 1.5600 | 1.0000 | 0.0030 | 0.0120 | 1000 | 16 |
| Comparative example 1 | — | 1.5600 | 1.0000 | — | — | 1000 | 16 |
| Comparative example 2 | — | 1.5600 | 1.0000 | 0.0150 | — | 1000 | 16 |
| Comparative example 3 | 1-1 | 1.5600 | 1.0000 | — | 0.0060 | 1000 | 16 |
| Comparative example 4 | 1-2 | 1.5600 | 1.0000 | — | 0.0060 | 1000 | 16 |

Examples 1 to 6

Tricobalt tetraoxide (average particle diameter 2 μm) and lithium carbonate (average particle diameter 7 μm) were weighed in such a way that the molar ratio of Li atom to cobalt atom became as shown in Table 2. Furthermore, $MgF_2$ (produced by STELLA CHEMIFA CORPORATION; average particle diameter 6.0 μm) and a sulfate were dry-mixed sufficiently in such a way that the molar ratio shown in Table 2 was ensured. Thereafter, firing was conducted in an alumina bowl in the air with a temperature and a time shown in Table 2. After completion of the firing, the fired product was recovered by turning the alumina bowl upside down. Subsequently, Example 7

Tricobalt tetraoxide (average particle diameter 2 μm) and lithium carbonate (average particle diameter 7 μm) were weighed in such a way that the molar ratio of Li atom to cobalt atom became as shown in Table 3. Furthermore, $MgF_2$ (produced by STELLA CHEMIFA CORPORATION; average particle diameter 6.0 μm), MgO (produced by Tateho Chemical Industries Co., Ltd.; average particle diameter 5.2 μm), and calcium sulfate (Sample 1-1) were used. Individual raw materials were dry-mixed sufficiently in such a way that the molar ratio shown in Table 3 was ensured. Thereafter, firing was conducted in an alumina bowl at 1,000° C. for 16 hours in the air. After completion of the firing, the fired product was recovered by turning the alumina bowl upside down. Subsequently, pulverization and sizing were conducted so that a lithium-transition metal compound oxide containing Mg atoms and sulfate groups was produced.

TABLE 3

| | Amount of blend of raw material (mol) | | | | |
|---|---|---|---|---|---|
| | Li2CO3 | Co3O4 | MgF2 | Mgo | Calcium sulfate |
| Example 7 | 1.56 | 1 | 0.0075 | 0.0075 | 0.0015 |

Example 7

Comparative Examples 5 and 6

Lithium-transition metal compound oxides containing Mg atoms and sulfate groups were produced as in Example 2 and Example 5 except that MgO (average particle diameter 5.2 μm) was used instead of MgF$_2$ in Example 2 and Example 5.

Regarding Examples 1 to 7, after the sample of the lithium-transition metal compound oxide was recovered, the state of the inside of the alumina bowl was visually observed. The results thereof are shown in Table 5 collectively.

The symbols in Table indicate the results as described below.

1: Almost no adhesion of product was observed on the bottom portion of the inner wall of the bowl.

2: Adhesion of product was observed in places of the bottom portion of the inner wall of the bowl.

3: Adhesion of product was observed all over the bottom portion of the inner wall of the bowl.

Evaluation of Physical Property of Lithium-Transition Metal Compound Oxide

Regarding the lithium-transition metal compound oxides obtained in Examples 1 to 7 and Comparative examples 1 to 6, the Mg content, the SO$_4$ content, the average particle diameter, the BET specific surface area, and the amount of free anion were measured. The Mg content and the amount of free anion were determined by the following measuring method.

(1) Mg Content

The Mg content is a value determined by dissolving the sample with an acid and measuring the resulting solution on the basis of ICP.

(2) SO$_4$ Content

The SO$_4$ content is a value determined by dissolving the sample with an acid and measuring the resulting solution on the basis of ICP.

(3) Measurement of the Amount of Free Anion

Various anions were eluted from particle surfaces by dispersing 30 g of lithium-transition metal compound oxide in 100 ml of pure water at 25° C. for 5 minutes and the amounts of anions of fluorine ions and sulfate ions were quantified on the basis of ion chromatography. The results thereof are shown in Table 4.

TABLE 4

| | Mg atom content (percent by weight) | SO$_4$ content (percent by weight) | Average particle diameter (μm) | BET specific surface area (m$^2$/g) | Amount of elution of anion | |
|---|---|---|---|---|---|---|
| | | | | | Fluorine ion (percent by weight) | Sulfate ion (percent by weight) |
| Example 1 | 0.125 | 0.107 | 14.1 | 0.23 | 0.107 | 0.118 |
| Example 2 | 0.127 | 0.207 | 14.0 | 0.22 | 0.115 | 0.254 |
| Example 3 | 0.123 | 0.412 | 13.7 | 0.22 | 0.111 | 0.428 |
| Example 4 | 0.129 | 0.127 | 13.9 | 0.26 | 0.077 | 0.112 |
| Example 5 | 0.123 | 0.240 | 13.4 | 0.24 | 0.059 | 0.259 |
| Example 6 | 0.128 | 0.386 | 13.5 | 0.24 | 0.027 | 0.431 |
| Example 7 | 0.125 | 0.113 | 13.7 | 0.23 | 0.055 | 0.109 |
| Comparative example 1 | 0.009 | 0.052 | 13.2 | 0.25 | 0.005 | 0.063 |
| Comparative example 2 | 0.123 | 0.057 | 14.1 | 0.24 | 0.081 | 0.067 |
| Comparative example 3 | 0.006 | 0.243 | 13.5 | 0.23 | 0.003 | 0.252 |
| Comparative example 4 | 0.051 | 0.242 | 13.4 | 0.24 | 0.003 | 0.256 |
| Comparative example 5 | 0.116 | 0.245 | 13.3 | 0.22 | 0.003 | 0.258 |
| Comparative example 6 | 0.124 | 0.238 | 13.2 | 0.23 | 0.004 | 0.255 |

Battery Performance Test (1) Preparation of Lithium Secondary Battery

A positive electrode agent was prepared by mixing 91 percent by weight of lithium-iron-phosphorus compound oxide obtained in one of Examples 1 to 7 and Comparative examples 1 to 6, 6 percent by weight of graphite powder, and 3 percent by weight of polyvinylidene fluoride. The resulting positive electrode agent was dispersed into N-methyl-2-pyrrolidinone so as to prepare a mixed paste. The resulting mixed paste was applied to aluminum foil. Thereafter, drying and pressing were conducted, so that a positive electrode plate in the shape of a disk having a diameter of 15 mm was stamped.

The resulting positive electrode plate and various members, e.g., a separator, a negative electrode, a positive electrode, a current collector, mounting brackets, external terminals, and an electrolytic solution, were used so as to produce a lithium secondary battery. Among them, as for the negative electrode, metal lithium foil was used, and as for the electrolytic solution, a solution in which 1 mol of LiPF$_6$ was dissolved in 1 liter of 1:1 mixed solution of ethylene carbonate and methyl ethyl carbonate was used.

(2) Evaluation of Battery Performance

The resulting lithium secondary battery was actuated at room temperature, and the following battery performance was evaluated.

Evaluation of Cycle Characteristic

The positive electrode was subjected to charging and discharging. Charging was conducted up to 4.4 V at 1.0 C over 5 hours through constant current constant voltage charging (CCCV) and, thereafter, discharging to 2.7 V was conducted at a discharging rate of 0.2 C. These operation was assumed to be one cycle, and the discharge capacity was measured on a cycle basis. This cycle was repeated 20 times, and the capacity maintenance factor was calculated from the discharge capacity in the first cycle and the discharge capacity in the twentieth cycle on the basis of the following equation. The discharge capacity in the first cycle was assumed to be an initial discharge capacity.

capacity maintenance factor (%)={(discharge capacity in the twentieth cycle)/(discharge capacity in the first cycle)}×100

TABLE 5

|  | Initial discharge capacity (mAh/g) | Capacity maintenance factor (%) | State of bowl inner wall |
|---|---|---|---|
| Example 1 | 160 | 97.4 | 2 |
| Example 2 | 159.8 | 97.3 | 2 |
| Example 3 | 159.8 | 97.1 | 2 |
| Example 4 | 160.3 | 97.0 | 3 |
| Example 5 | 159.7 | 97.0 | 3 |
| Example 6 | 162.2 | 97.1 | 3 |
| Example 7 | 159.8 | 97.2 | 1 |
| Comparative example 1 | 164.1 | 93.0 | — |
| Comparative example 2 | 160.1 | 95.6 | — |
| Comparative example 3 | 159.8 | 94.1 | — |
| Comparative example 4 | 161.3 | 93.9 | — |
| Comparative example 5 | 160 | 94.1 | — |
| Comparative example 6 | 160.2 | 94.2 | — |

As is clear from Table 5, regarding the cycle characteristic, Examples 1 to 7 exhibit good cycle characteristics of 97% or more. Furthermore, in the case where the second magnesium compound is used in combination, particularly good state of the bowl is maintained while an excellent cycle characteristic is maintained.

What is claimed is:

1. A method for manufacturing a positive electrode active material for a lithium secondary battery, the method comprising the steps of:

using a magnesium halide as a magnesium compound in a method for manufacturing a lithium-transition metal compound oxide containing magnesium atoms and sulfate groups by mixing compounds $Li_2CO_3$, $MgF_2$, $CaSO_4$ and at least one of $Co_3O_4$ or CoOOH; and calcining the compounds to form the positive electrode;

wherein said step of using includes having an average particle diameter of the magnesium halide in a range between 1.0 to 30.0 μm, and having an average particle diameter of the sulfate groups in a range between 1.0 to 500 μm;

said step of using also includes eluting a content of 5,000 ppm or less free anions into water; and wherein said step of using further includes mixing MgO, $Mg(OH)_2$ and $MgCO_3$ together to prevent the compounds from adhering to a container due to a reaction between an anionic substance and a container during said step of calcining so that the compounds calcined in said step of calcining are easily releasable from the container.

2. A method for manufacturing a positive electrode active material for a lithium secondary battery, the method comprising the steps of:

using a magnesium halide as a magnesium compound in a method for manufacturing a lithium-transition metal compound oxide containing magnesium atoms and sulfate groups by mixing compounds $Li_2CO_3$, a cobalt compound, $MgF_2$ and $CaSO_4$; and calcining the compounds to form the positive electrode;

wherein said step of using includes having an average particle diameter of the magnesium halide in a range between 1.0 to 30.0 μm, and having an average particle diameter of the sulfate groups in a range between 1.0 to 500 μm; and said step of using also includes eluting a content of 5,000 ppm or less free anions into water; and wherein said step of using further includes mixing MgO, $Mg(OH)_2$ and $MgCO_3$ together to prevent the compounds from adhering to a container due to a reaction between an anionic substance and a container during said step of calcining so that the compounds calcined in said step of calcining are easily releasable from the container.

* * * * *